United States Patent [19]

English

[11] 4,067,382
[45] Jan. 10, 1978

[54] HEAT RECLAIM SYSTEM

[75] Inventor: Alan English, Cleveland, Ohio

[73] Assignee: The Hanna Mining Company, Cleveland, Ohio

[21] Appl. No.: 508,184

[22] Filed: Sept. 23, 1974

[51] Int. Cl.² .................................................. F28D 15/00
[52] U.S. Cl. ............................................. 165/35; 34/86;
165/DIG. 12; 165/107; 165/134; 432/82
[58] Field of Search ................. 165/DIG. 12, 107, 35, 165/134; 34/86; 432/180, 82

[56] References Cited

U.S. PATENT DOCUMENTS

| | | | |
|---|---|---|---|
| 2,683,590 | 7/1950 | Bauer | 165/35 |
| 3,050,867 | 8/1962 | Friedman | 34/86 |
| 3,194,308 | 7/1965 | Haried | 165/DIG. 12 |
| 3,623,235 | 11/1971 | Smith, Jr. | 34/86 X |
| 3,739,482 | 6/1973 | Berg | 34/86 X |
| 3,905,126 | 9/1975 | Villalobos | 34/86 X |

Primary Examiner—Albert W. Davis, Jr.
Attorney, Agent, or Firm—Donnelly, Maky, Renner & Otto

[57] ABSTRACT

A heat reclaim system for reclaiming waste heat from a material processing line by bleeding a portion of the heated air from one or more points on the material heat processing line and directing such heated air through an economizer containing a bank of serpentine coils. Water is pumped through the economizer coils to extract heat from the air, and the heated water leaving the economizer is piped to another heat exchanger where the reclaimed heat is extracted from the water for use in other processes. More than one economizer may be provided in each heat reclaim system for receiving bleed-off air from different points on the material heat processing line, with the economizers connected in series to obtain the highest temperature difference between the air and water. Separate waste heat reclaim systems should be provided for each material heat processing line, with separate controls for each of the heat reclaim systems to permit the heat reclaim systems to operate independently of the other systems so that any one line may be shut down without affecting the operation of the other lines.

13 Claims, 5 Drawing Figures

HEAT RECLAIM SYSTEM

This invention relates generally as indicated to a heat reclaim system for recuperating waste heat from various material heat processing operations for use in other processes.

In the heat processing of iron ore concentrates and other materials, there is usually some form of heat recuperation to minimize fuel consumption, but the normal methods presently being used particularly in straight grate indurating equipment still permit large amounts of heat to be wasted to the atmosphere.

Additional heat recovery is possible from both the straight grate and grate-kiln indurating equipment used in pelletizing operations and the like. Significant amounts of heat are lost both from the cooling and recuperation sections of such straight grate equipment, and also from the cooling section of such grate-kiln equipment, and it has been found that by bleeding off air from these areas and directing such air to suitable heat exchangers, the heat recovery is substantial and can be effectively used for other purposes such as building heating, concentrate drying, preheating Aerofall Mill classification air to dispel moisture from the ore grinding and classification circuit, or any other process requiring sensible heat. Since building heating is seasonable and concentrate drying is only needed during the freezing period, preheating the air for the ore grinding and classification circuit provides maximum utilization of the reclaimed waste heat which can be utilized as the major source of classification air heat.

Concentrate drying also requires the use of steam, and accordingly if the available waste heat is used for creating the steam needed for concentrate drying, the need for putting in a costly steam plant for that purpose is eliminated.

In a typical pelletizing plant including several straight grate indurating lines, tremendous quantities of waste heat are exhausted to the atmosphere. Not only is this costly from a fuel consumption standpoint, but the higher fuel consumption also greatly increases the particulate load in the stack exit gases and the plant emissions of sulfur dioxide, which is objectionable from a pollution standpoint.

It is accordingly a principal object of this invention to provide a practical and economical system for reclaiming waste heat from material heat processing operations for effective use elsewhere.

Another object is to provide such a system for reclaiming waste heat especially for use in heating Aerofall Mill classification air.

Still another object is to provide such a heat reclaim system with effective controls which permit reclamation of heat from plural material heat processing lines at the same time and shut-down of any one of the lines without affecting the rest of the system.

Still another object is to provide a heat reclaim system with effective dew point safety control and protection against overheating.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 5 is a fragmentary schematic diagram of another typical material heat processing system from which waste heat may be reclaimed utilizing the various heat reclaim systems of the present invention.

DESCRIPTION OF THE PREFERRED EMBODIMENTS

Figure 1:
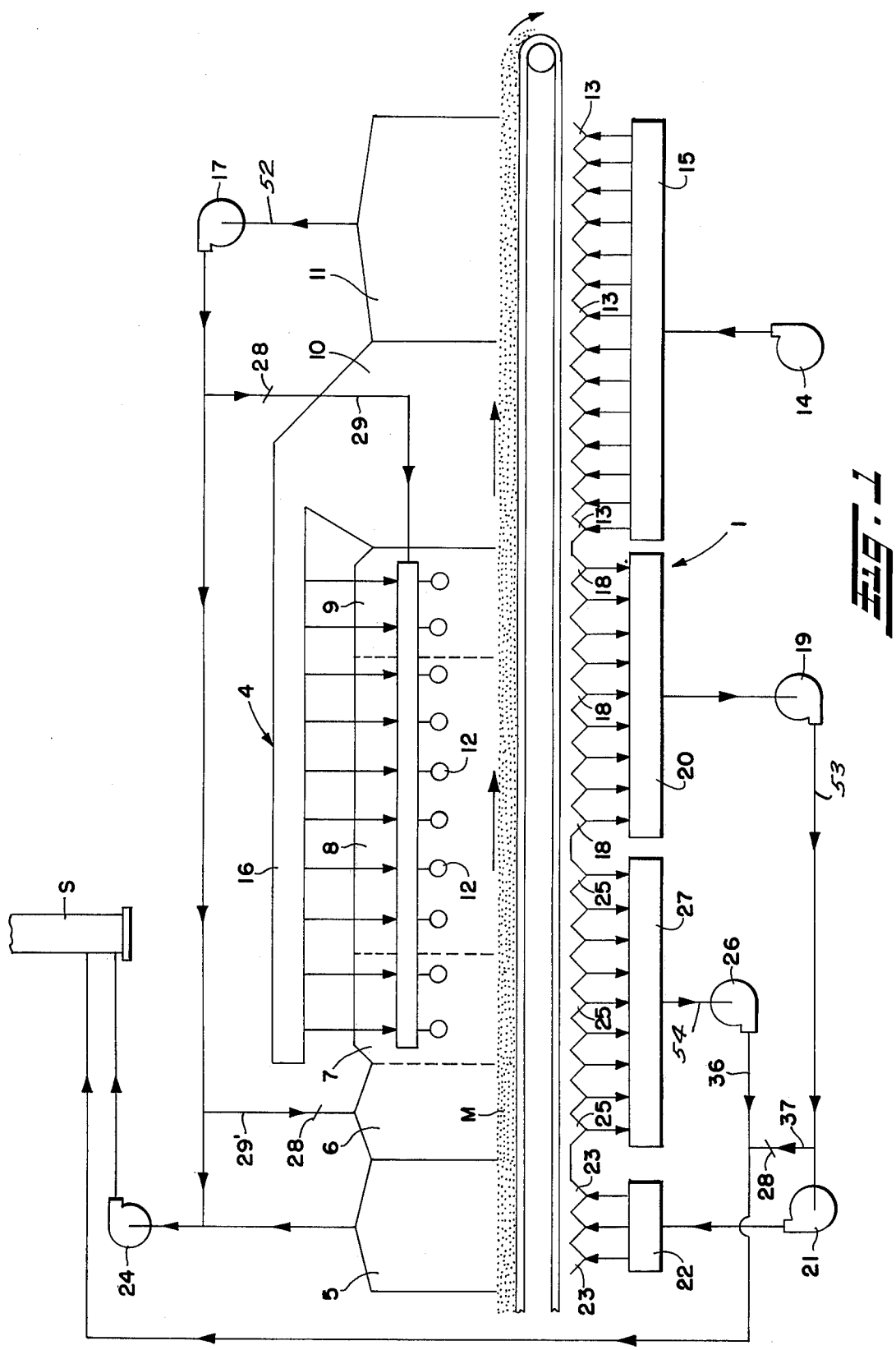
FIG. 1 is a schematic diagram of a typical material heat processing system from which waste heat may be reclaimed utilizing the various heat reclaim systems of the present invention.

Referring now in detail to the drawings and initially to FIG. 1 thereof, there is shown by way of example a material heat processing line 1 including a movable grate 2 for moving the material M to be treated from left to right through a furnace 4 including a series of stations or sections where the material is first dried in sections 5 and 6, then preheated in section 7 and fired in sections 8 and 9 and finally cooled in various stages in sections 10 and 11. A plurality of burners 12 direct a flame and hot gases into the preheat and firing sections 7, 8 and 9 of the furnace 4.

The cooling sections 10 and 11 are primary and secondary cooling sections, respectively, which receive and cool in that order the material burned in the furnace. Beneath the primary and secondary cooling sections 10 and 11 are a plurality of windboxes 13 which receive cold air from a blowing fan 14 and air distributing chamber 15 and direct the cold air upwardly through the traveling grate 2 and the bed of material M on the grate in the primary and secondary cooling sections. As shown, the air which is forced upwardly into the primary cooling section 10 is directed to an air header 16 above the furnace 4 for discharge into the furnace to provide air for combustion of the fuel introduced by the burners 12. A hood recuperation fan 17 withdraws the air through conduit 52 from the secondary cooling section 11 which has been forced upwardly through the bed of material by the blower fan 14, and a portion of this heated air is directed to the burners 12 to provide additional air for combustion of the fuel. A portion of the heated air leaving the secondary cooling section 11 is also directed to the downdraft drying section 6. The remainder of the heated air exhausted from the secondary cooling section 11 is ordinarily vented to the atmosphere through the stack S as by the exhaust fan 24.

A plurality of windboxes 18 are also positioned beneath the firing sections 8 and 9 of the furnace, and a suction fan 19 in communication with these windboxes through chamber 20 and conduit 53 exhausts hot gases from the furnace through the bed of material. These hot gases from the furnace may be forced upwardly by an updraft drying fan 21 into a chamber 22 for discharge through a plurality of windboxes 23 beneath the updraft drying section 5 upstream of and immediately adjacent to the downdraft drying section 6 for upward passage of hot gases through the granular material on the grate prior to introduction into the preheat and firing sections of the furnace. A hood exhaust fan 24 exhausts the gases from the updraft drying section 5 and vents them to atmosphere through the stack S.

Additional windboxes 25 are shown located beneath the downdraft drying section 6, preheat section 7, and a portion of the firing section 8 of the furnace. A waste gas fan 26 in communication with these additional windboxes 25 through chamber 27 and conduit 54 exhausts gases from the various sections 6, 7 and 8 of the furnace through the bed of material and vents the gases to atmosphere through the conduit 36 and stack S.

Suitable dampers 28 may be provided in the air conduits 29, 29' from the secondary cooling section 11 to the burners 12 and downdraft drying section 6 to control the flow of heated air in the conduits, and dust collectors, not shown, may also be provided wherever required. A bypass conduit 37 may also be provided between the suction fan 19 and updraft drying fan 21 to permit the fan 19 to operate independently of the fan 21 and bypass the updraft drying section 5 for venting of the exhaust gases from the furnace directly to atmosphere through conduit 36 and stack S upon opening the damper 28 in conduit 37 if desired.

Although the material heat processing line 1 illustrated in FIG. 1 provides for some heat recuperation to minimize fuel consumption, large amounts of heat are still wasted to the atmosphere, particularly from the cooling section 11 and firing sections 8 and 9. The heat reclaim system of the present invention provides an effective means for recuperating such waste heat and making good use of it, in a manner to be subsequently fully described.

Figure 2:
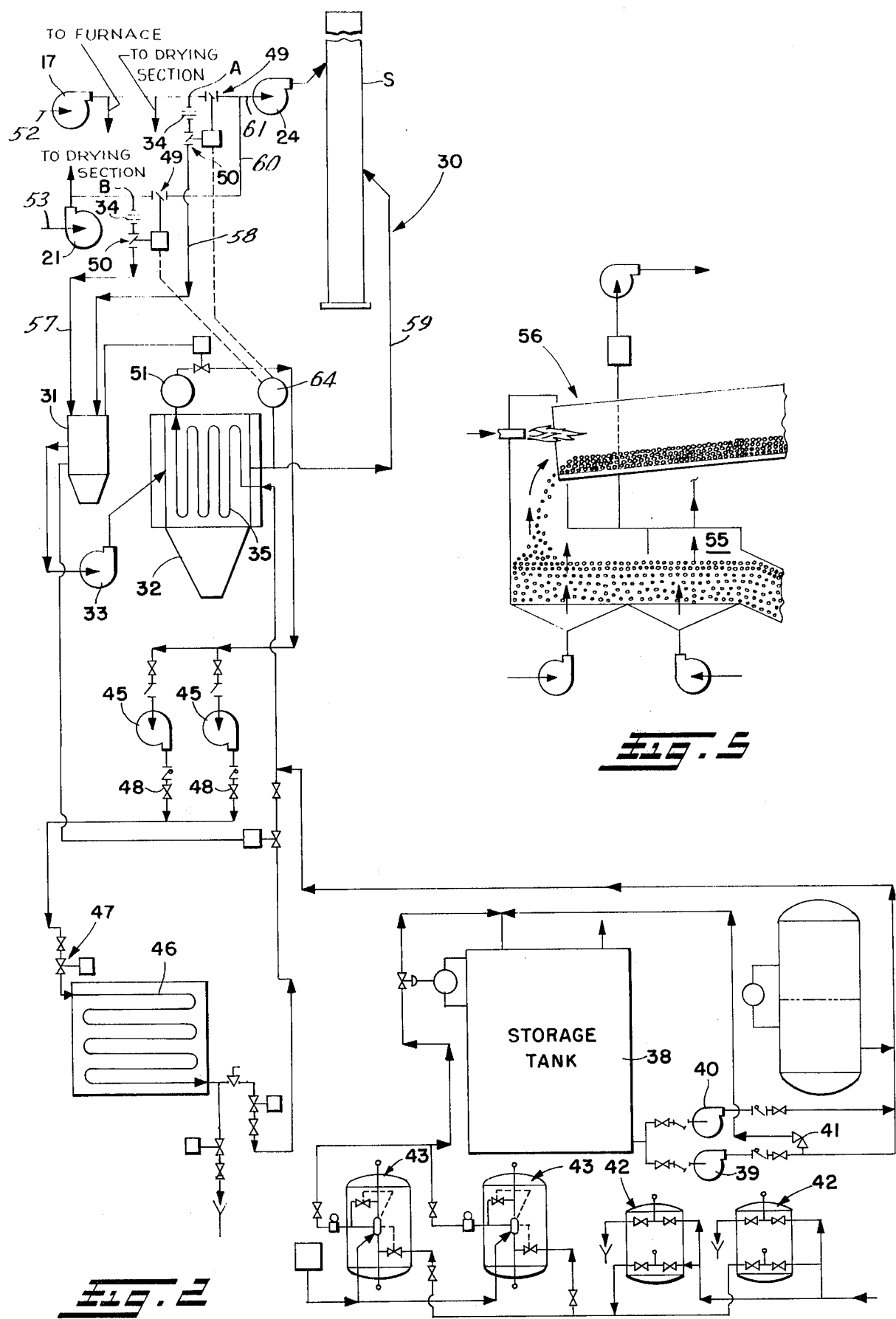
FIG. 2 is a schematic diagram illustrating a preferred form of heat reclaim system in accordance with the present invention for reclaiming waste heat from a single material processing line.

In FIG. 2 there is shown a preferred form of heat recovery system 30 in accordance with this invention for use in recovering additional waste heat from a material processing line such as illustrated in FIG. 1. Included in the system is the hood recuperation fan 17 of the material processing line of FIG. 1 which directs a portion of the hot exhaust gases from the secondary cooling section 11 to the burners 12 to provide combustion air and also to the downdraft drying section 6 for drying the material prior to entering the preheat and firing sections 7, 8 and 9. Also included in the system of FIG. 2 is the updraft drying fan 21 of FIG. 1 which forces the hot exhaust gases from the furnace through the updraft drying section 5.

To obtain additional heat recovery utilizing the heat recovery system 30 of FIG. 2, a portion of the air received by the updraft drying fan 21 and hood recuperation fan 17 through conduits 53 and 52, respectively, is bled off and directed to a drop-out box 31 through conduits 57 and 58, respectively where the air is mixed and combined and the pressure is equalized. The amount of air bled off may be varied as desired depending on requirements, and in fact all of the air from one or both of the fans 21 and 17 may be passed through the heat recovery system if desired. The mixed bleed-off gas temperatures from the cooling and recuperation fans 21, 17 of the material processing apparatus of FIG. 1 may range from 525° to 575° F with an average temperature of approximately 550° F. Since these gas temperatures and volumes are variable, an exit temperature safely above apparatus dew point (approximately 180° F) is advisable due to the sulfur dioxide content in the waste gas.

From the drop-out box 31 the bleed air is directed to an economizer 32 which the air enters at approximately 550° F. A supply fan 33 may be required for supplying air to the economizer 32 depending upon whether there is sufficient positive static pressure available at the two bleed-off points A and B to overcome the added pressure drop through the heat reclaim system 30. If the lowest fan pressure of fans 17 and 21 is equal to or greater than the added pressure drop, no additional fan will be required. However, the positive pressure of the two bleed-off supplies through conduits 57 and 58 must be equalized by adjustable orifices 34 prior to entry into the drop-out box 31.

The economizer 32 consists of a single air pass through a deep bank of serpentine coils 35, and water is supplied to the serpentine coils 35 counterflow to the air flow. The heat absorption rate of the water is desirably based on approximately a 300° F drop in gas temperature, which means that the leaving gas temperature will be in the range of approximately 250° F. The exit gases from the economizer 32 are then exhausted to the main stack S through conduit 59.

Waste heat recovery in exhaust gases containing products of fuel oil combustion and a relatively high particulate load usually makes air to air heat exchangers best suited for this type of recovery due to the relatively low waste gas entry temperature (less than 600° F) and its relatively high apparatus dew point (approximately 180° F). However, because of the large amounts of waste heat to be recovered, it is physically and economically impractical to use air as the transfer media. Accordingly, the heat recovery system of the present invention utilizes water as the transfer media because it is economical to transport to and from the various points where it is to be used and is also compatible with the heat recovery system of the present invention.

A closed water system is provided for the water to the economizer 32 so that only a small amount of make-up water is required for water lost through leaks, packing seals, etc. Make-up water may be supplied to the system from a make-up water storage tank 38 by two supply pumps 39 and 40. One of the supply pumps 39 is a small capacity pump which may be operated constantly with a bypass pressure relief valve 41 on the discharge which returns the relieved water to the storage tank. The other pump 40 may be much larger, having a capacity equal to approximately 25% of the total supply pumping capacity, to provide for emergency make-up in case of a major line leak.

Small capacity pressure water filters 42 and zeolite water softeners 43 are provided for filtering and treating the make-up water to correct for total hardness and iron content, and provision should also be made for injecting oxygen absorbing chemicals and correcting the pH of the water to protect or inhibit corrosion of the system.

After the water passes through the economizer 32, the water is piped to the suction side of one or more circulating supply pumps 45 (two such pumps being shown in parallel circuit relation to each other) which pump the heated water to wherever desired to permit reclamation of the stored heat from the water for such useful purposes as building heating, production of low temperature steam, and so on. However, it has been found that maximum utilization of the reclaimed waste heat can be obtained by pumping the heated water through an air heating coil bank 46 for heating air by the water for use in other processes requiring sensible heat such as an Aerofall Mill air classification system. The coils in the coil bank 46 should be sized to permit the air passing thereover to extract heat equal to approximately a 250° F temperature drop in the supply water so that the supply water is returned to the heat reclaim economizer 32 at approximately 100° F for reheating back to approximately 350° F.

Figure 3:
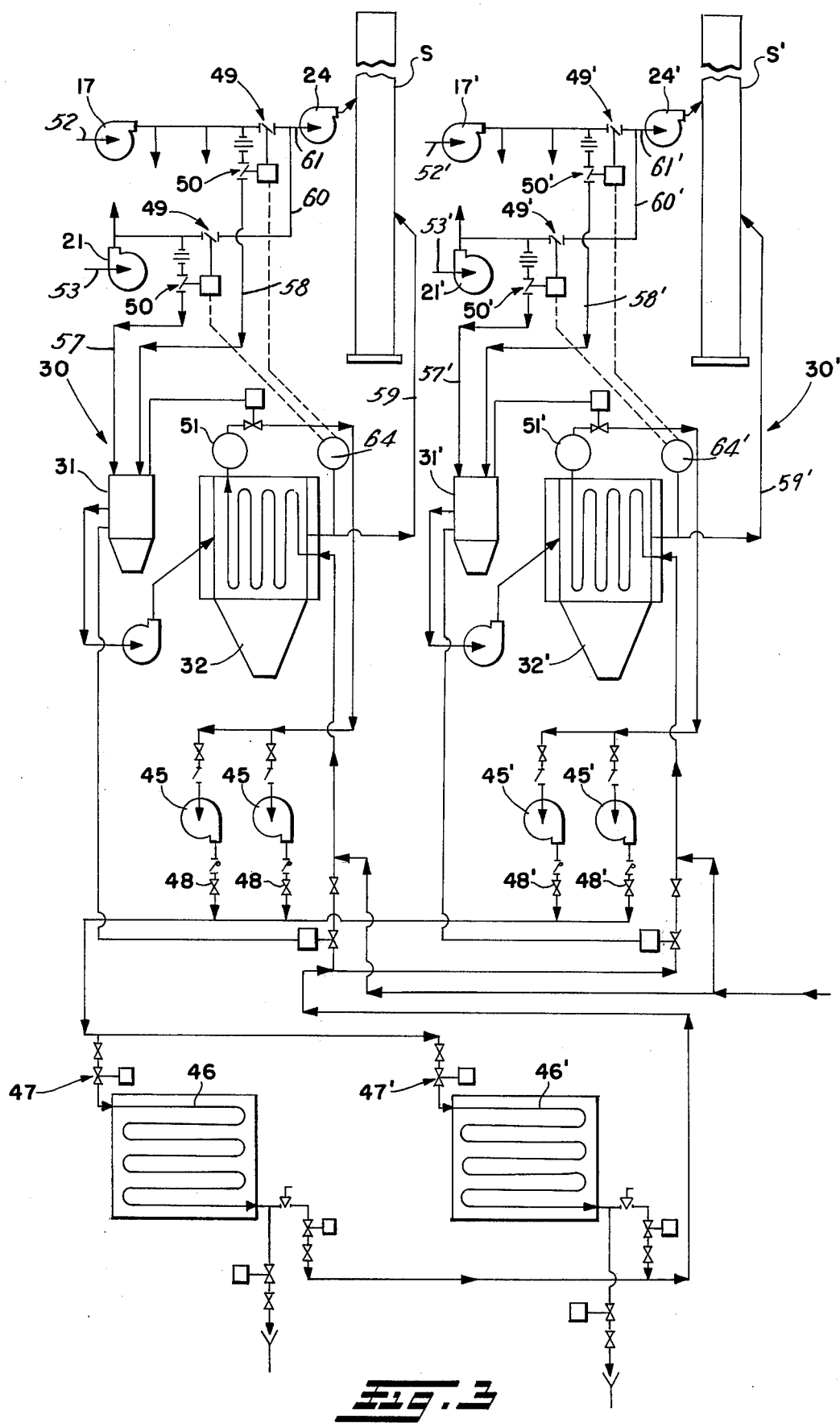
FIG. 3 is a schematic diagram similar to FIG. 1, but showing a modified form of heat reclaim system in accordance with this invention for use in reclaiming waste heat from two separate processing lines.

Separate waste heat reclaim systems 30 such as shown in FIG. 2 should be provided for each material heat processing line and made to operate independently of the other systems to permit shut-down of any one line without affecting the balance of the total system. Two such waste heat reclaim systems 30 and 30' are shown in FIG. 3 each associated with a different material heat processing line and each including updraft drying fans 21, 21' and hood recuperation fans 17, 17'. Of course, the coil banks 46, 46' in the Aerofall Mill air classification circuits should match the capabilities of the respective economizers 32, 32', and if any of the material processing lines are shut down, the corresponding air heating coil banks and pumping thereto must be reduced to prevent coil freeze-up. The flow of heated water through the respective coil banks 46, 46' is separately controlled by independent operation of the respective power control valves 47, 47'.

Each of the various waste heat reclaim systems 30, 30' may be energized by the pressure and temperature of the bleed-off air through conduits 57, 57' and 58, 58' from each material heat processing line. The starting of the fans for the material heat processing lines will energize the water circulating pump circuits for the respective heat reclaim systems, open the automatic shut-off valves 48, 48' and start water circulating to the economizers. Conversely, when the respective circulating pumps 45, 45' stop, the automatic valves 48, 48' will close on the water circuits, and if there is a substantial drop in bleed-off air temperature below a predetermined temperature, for example 500° F, the control devices 64, 64' will cause the bypass air valves 49, 49' to open for passage of the air through bypass conduits 60, 60' and 61, 61' directly to the stack S, S' and the supply air valves 50, 50' to close thus stopping air flow through the economizers 32, 32' to provide automatic dew point safety control.

To prevent overheating of the water in the economizers 32, 32', a combination pressure-temperature device 51, 51' may be provided in the water line on the exit side of the economizers 32, 32' for closing the air valve 50, 50' on the air supply through conduits 57, 57' and 58, 58' to the economizers and opening the bleed-off air valve 49, 49' to the stack S, S' through conduits 60, 60' and 61, 61' to shut off the air supply. Pressure relief valves on the economizers' water supply drums also prevent overpressure.

Make-up water may be supplied to each of the heat reclaim systems 30, 30' from the same water storage tank 38 and supply pumps 39 and 40 shown in FIG. 2.

Figure 4:
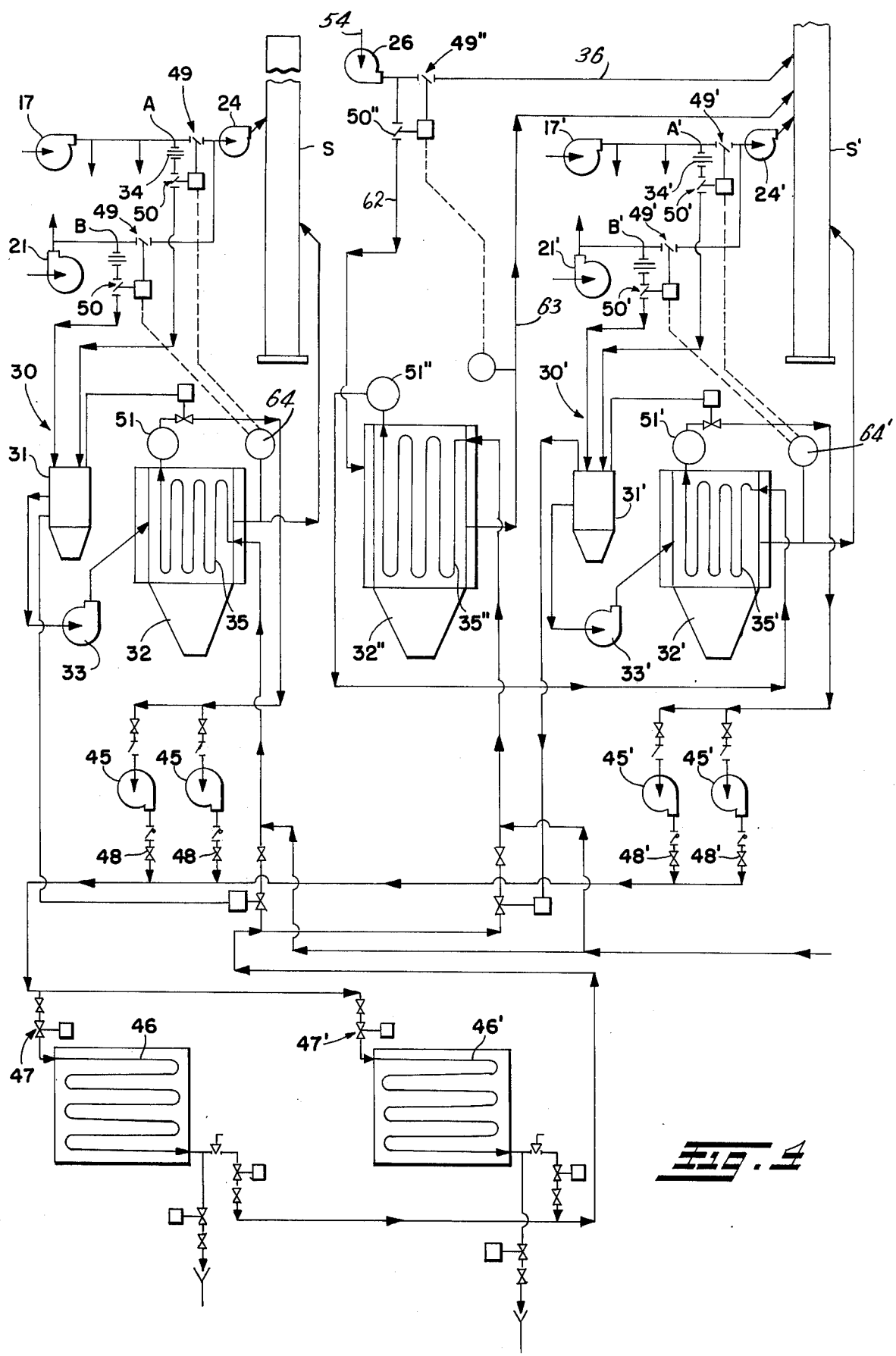
FIG. 4 is a schematic diagram of a heat reclaim system similar to FIG. 3 but showing the use of more than one heat exchanger for recovering waste heat from the same processing line.

If the temperature of the waste gas exhaust from the downdraft drying and preheating sections 6 and 7 of any of the material heat processing lines 1 is sufficiently above the apparatus dew point, for example, 350° F, heat may also be reclaimed from such waste gas exhaust as by providing an additional economizer 32" in the heat reclaim system 30" for that particular material processing line. The waste gas exhaust from the waste gas exhaust fan 26 from which additional heat is to be reclaimed is supplied through conduit 62 to an additional economizer 32" and then returned through conduit 63 to the main stack S' as shown in FIG. 4. The water flowing through the additional economizer 32" is put in series with the associated bleed-off air economizer 32' to create the highest temperature difference between the air and water, but the water flow is desirably increased to maintain the same temperature difference between the supply and return water as in the heat reclaim systems 30 associated with the other material heat processing lines 1. These additional economizers 32" may be automatically controlled with safety protection in the same manner as previously described for the bleed-off air economizers 32, 32'.

From the foregoing, it will now be apparent that the various heat reclaim systems of the present invention are both physically and economically practical for use in reclaiming waste heat from the exhaust gases of various material heat processing lines by bleeding off air at different points along the lines. These points will of course vary depending on the particular material heat processing line. The material heat processing line shown in FIG. 1, for example, is of the straight grate furnace type from which additional heat recovery is possible from both the cooling and firing sections and also possibly from the downdraft drying and preheating sections as previously described. Significant amounts of heat may also be recovered from other material heat processing lines, for example, from the air being discharged from the cooling section 55 of a grate-kiln 56 such as shown schematically in FIG. 5 and described in greater detail in U.S. Pat. No. 3,671,027, granted June 20, 1972, which is incorporated herein by reference. All or a portion of the cooling air which is heated by passing through the bed in the cooling section 55, rather than being vented directly to atmosphere through a stack, may be directed to a heat recovery system 30 of the type previously described and illustrated for recovery of heat therefrom for other purposes. Moreover, the nature of such heat reclaim systems is such that they have a relatively long life, and the annual fuel savings resulting from such additional heat recovery is very substantial. There are also some side benefits obtained from such heat reclaim systems, including a reduction in the particulate load and sulfur dioxide in the stack exit gases because of a reduction in the amount of fuel required and increased operating efficiency.

The embodiments of the invention in which an exclusive property or privilege is claimed are defined as follows:

1. A heat reclaim system for reclaiming waste heat from a material heat processing line comprising means for bleeding heated air from a plurality of points on a material heat processing line, an economizer containing a bank of serpentine coils, means for circulating water through said coils, means for directing such heated air through said economizer in a single pass to permit extraction of heat from the air by the water flowing through said coils to heat the water, heat extraction means for subsequently extracting the heat from the water after leaving said economizer for use in other processes, and means providing a closed water system permitting continuous flow of the water between said economizer and heat extraction means, each said means for bleeding heated air from the material processing line comprising a supply air conduit for passage of heated air from a point on the material heat processing line to said economizer, a supply air valve for selectively opening and closing said supply air conduit, a bypass conduit for passage of heated air from such point on such material heat processing line to a stack, a bypass air valve for selectively opening and closing said bypass conduit, and means for closing said supply air valve and opening said bypass air valve for stopping air flow through said economizer in response to a drop in the bleed air temperature below a predetermined level to provide automatic dew point safety control.

2. The system of claim 1 further comprising a combination pressure-temperature device in the water line on the exit side of said economizer for closing said supply air valves and opening said bypass air valves to shut off the air supply to said economizer to prevent overheating of the water in said economizer in response to the temperature of the water reaching a predetermined high level.

3. The system of claim 1 further comprising a drop-out box for receiving the bleed air from such plurality of different points to mix the bleed air prior to passage through said economizer.

4. The system of claim 3 wherein heated air is bled off from both the updraft drying fan, hood recuperation fan, and recuperation fan of a straight grate furnace and mixed in said drop-out box.

5. The system of claim 3 further comprising adjustable orifice means in each of said supply air conduits for equalizing the pressure of such heated bleed air in said air supply conduits prior to entry into said drop-out box.

6. The system of claim 3 further comprising a supply fan between said drop-out box and economizer for supplying the heated bleed air from said drop-out box for passage through said economizer in a direction counterflow to the water passing through said coils.

7. The system of claim 3 wherein said heat extraction means comprises an air heating coil bank through which the heated water is circulated after circulation through said economizer for heating air by the water for use in such other processes.

8. The system of claim 1 further comprising pump means for providing make-up water to said closed water system, said pump means including a small capacity pump which is operated constantly to supply such make-up water, and a larger capacity pump to provide for emergency make-up in case of a major line break.

9. The system of claim 1 further comprising fan means for supplying such heated bleed air to said economizer, water circulating pump means for circulating the heated water from said economizer to said heat extraction means, automatic shutoff valve means associated with said water pump means, and means for actuating said water circulating pump means and opening said shut-off valve means to cause water to flow from said economizer to said heat extraction means only during operation of said fan means.

10. The system of claim 9 wherein there are a plurality of said water circulating pump means in parallel circuit relation to each other, and automatic shut-off valve means associated with each of said water pump circulating means.

11. The system of claim 1 wherein heated air is bled off from the cooling section of a grate-kiln.

12. A heat reclaim system for reclaiming waste heat from a material heat processing line comprising a plurality of supply air conduit means for bleeding heated air from a plurality of points on a material heat processing line, an economizer containing a bank of serpentine coils, means for circulating water through said coils, a drop-out box for receiving bleed air from said plural supply air conduit means to mix the bleed air prior to passage through said economizer, adjustable orifice means in each of said plural supply air conduit means for equalizing the pressure of such heated bleed air in said supply air conduit means prior to entry into said drop-out box, means for directing such heated air from said drop-out box through said economizer in a single pass to permit extraction of heat from the air by the water flowing through said coils to heat the water, heat extraction means for subsequently extracting the heat from the water after leaving said economizer for use in other processes, and means providing a closed water system permitting continuous flow of the water between said economizer and heat extraction means.

13. The system of claim 12 further comprising a supply fan between said drop-out box and economizer for supplying the heated bleed air from said drop-out box for passage through said economizer in a direction counterflow to the water passing through said coils.

* * * * *